F. OVERFIELD.
WATER WHEEL.
APPLICATION FILED MAR. 2, 1910.

980,666.

Patented Jan. 3, 1911.
4 SHEETS—SHEET 1.

Witnesses
Theo. Rosemann
R. H. Krenkel

Inventor
Frederick Overfield,
By Joshua R. H. Potts
Attorney

F. OVERFIELD.
WATER WHEEL.
APPLICATION FILED MAR. 2, 1910.

980,666.

Patented Jan. 3, 1911.
4 SHEETS—SHEET 4.

Witnesses

Inventor
Frederick Overfield,
By Joshua R. H. Potts
Attorney

UNITED STATES PATENT OFFICE.

FREDERICK OVERFIELD, OF CORNWALL, NEW YORK.

WATER-WHEEL.

980,666.  Specification of Letters Patent.  Patented Jan. 3, 1911.

Application filed March 2, 1910. Serial No. 546,934.

*To all whom it may concern:*

Be it known that I, FREDERICK OVERFIELD, a citizen of the United States, residing at Cornwall, county of Orange, and State of New York, have invented certain new and useful Improvements in Water-Wheels, of which the following is a specification.

My invention relates to improvements in water wheels, the object of the invention being to provide a wheel with a circular series of cylinders, and pistons therein, opposed pistons being rigidly connected and adapted when reciprocated by the water to transmit to the wheel a rotary movement.

A further object is to provide an improved water wheel with a circular series of alined cylinders, in which the alined cylinders at one side of the wheel register with an alined series at the opposite side of the wheel, and pistons in said cylinders rigidly connected, and mechanism when operated by the reciprocation of said pistons, due to the action of water thereon, will transmit to the wheel a rotary motion.

With these and other objects in view, the invention consists in certain novel features of construction, and combinations and arrangements of parts as will be more fully hereinafter described and pointed out in the claims.

Figure 1:
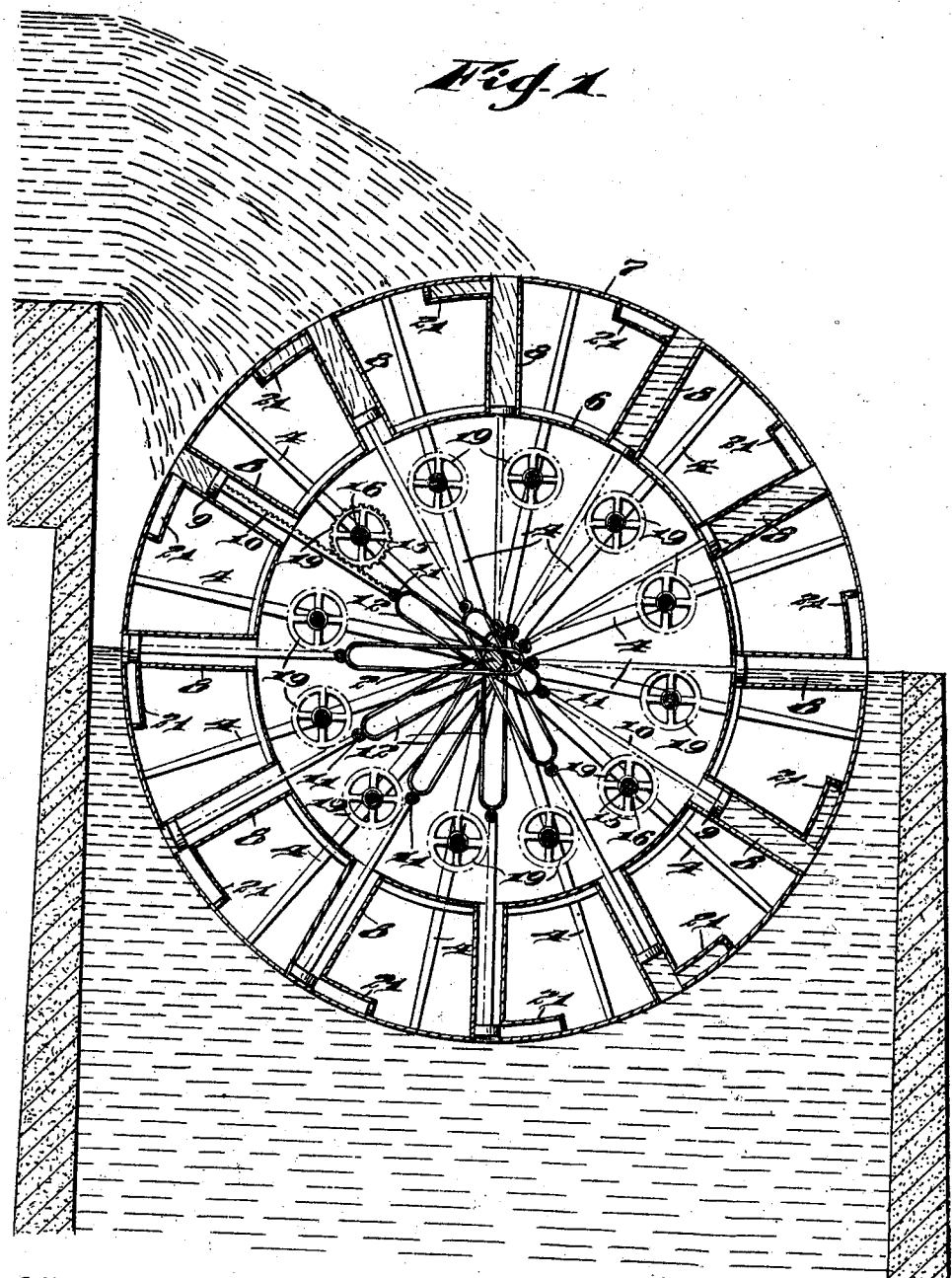
Figure 2:
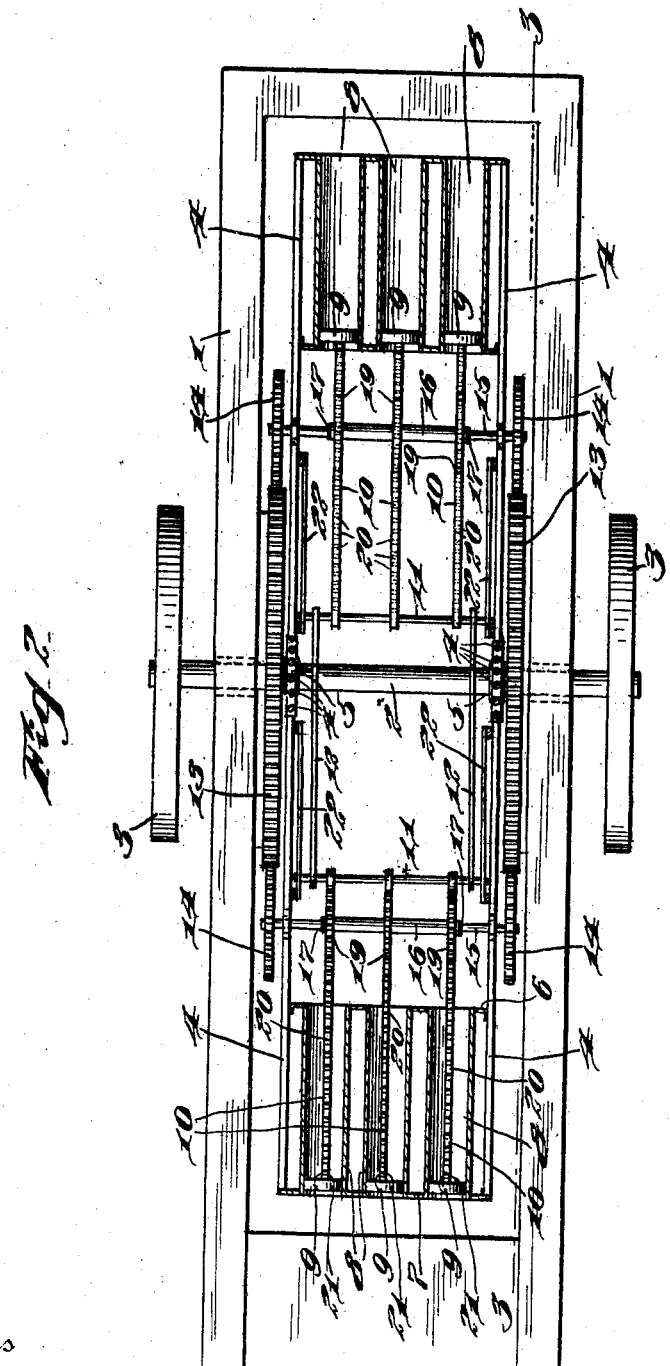
Figure 3:
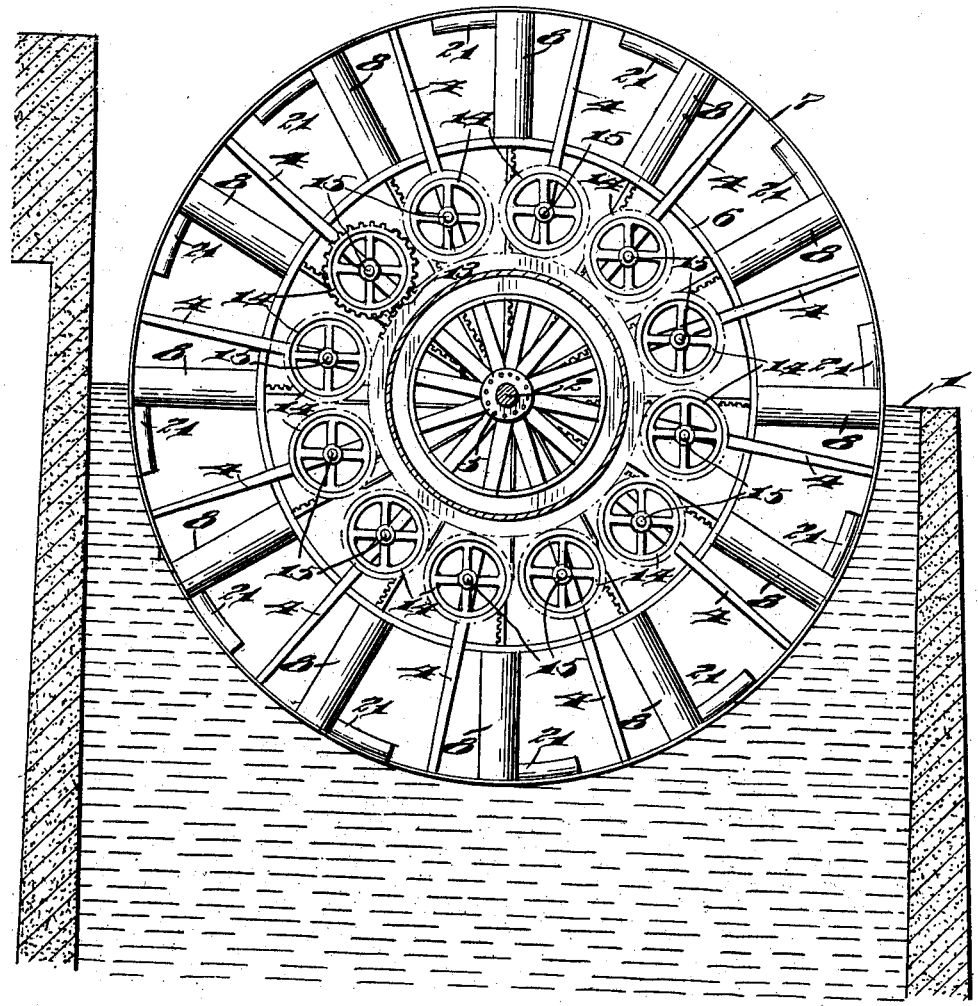
Figure 4:
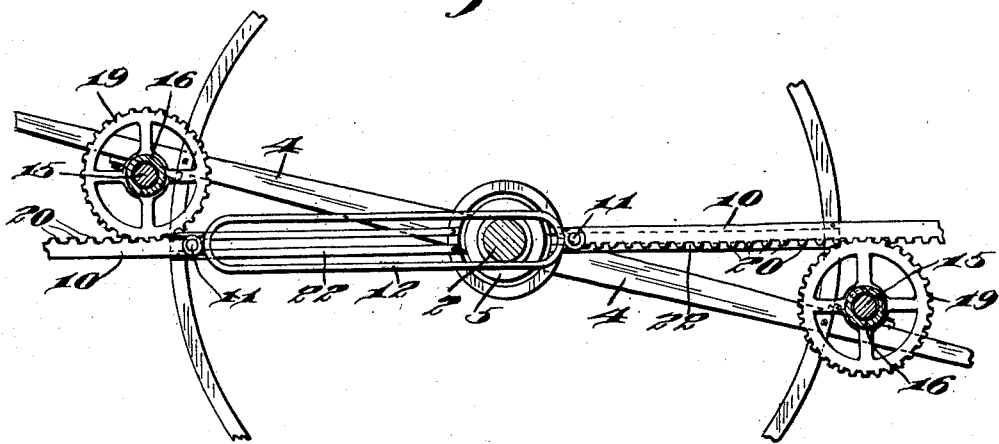
Figure 5:
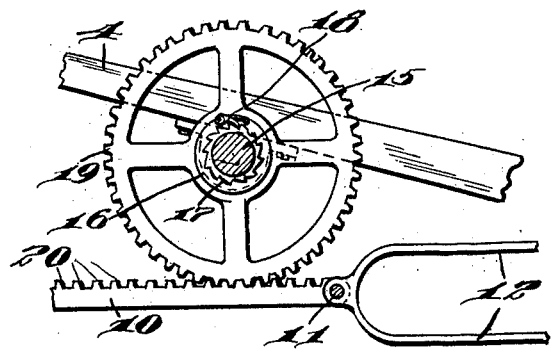
Figure 6:
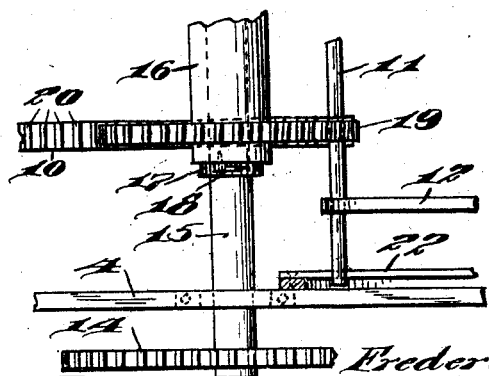

In the accompanying drawings, Figure 1, is a view in vertical, longitudinal section illustrating my improvements. Fig. 2, is a top plan view showing the wheel in horizontal section. Fig. 3, is a view in section on the line 3—3 of Fig. 2. Figs. 4, 5 and 6, are enlarged views of details of construction.

1, 1, represent supporting walls affording a bearing for a shaft 2, which projects out beyond the walls, and from which power is to be taken off by means of pulleys 3, or otherwise.

On shaft 2 my improved water wheel is rigidly secured, and when turned, transmits a rotary motion to the shaft. The frame work of the wheel may be made up in various ways, but preferably of skeleton form as illustrated, in which a plurality of radial spokes 4 connect a sleeve or hub portion 5, which is secured to shaft 2 with two concentric rings 6 and 7. The rings 6 and 7 support a circular series of radially disposed cylinders 8, there being a plurality of cylinders side by side as illustrated in Fig. 2, and as many of said cylinders as desired, and the cylinders so arranged, that those at one side of the wheel exactly register with those at the opposite side of the wheel.

A piston 9 is provided in each cylinder, and a piston rod 10 secured to each piston. Each set of piston rods is connected by a transverse rod 11, and I would have it understood that hereinafter when a " set" of pistons, cylinders, or piston rods are referred to, the term is intended to indicate a plurality of such parts, which are arranged transversely of the wheel, and side by side. The rods 11 of the opposed sets of piston rods are connected by yokes 12, which move on the shaft 2, and in order that there may be no interference of these yokes, they are arranged in different vertical planes, transversely of the wheel, there being two of said yokes employed to connect the opposed rods 11, so that the pistons and the piston rods of opposed cylinders, are compelled to operate in unison, that is, when one set of pistons move inward, the opposed set of pistons are moved outward, as they are rigidly connected together.

Circular racks 13 are secured rigidly to the walls 1, and are engaged by a circular series of pinions 14. These pinions 14 are secured upon shafts 15, which are supported in suitable bearings on the spokes 4, and on these shafts 15, tubes or sleeves 16 are mounted to turn, and as shown most clearly in Figs. 5 and 6, have ratchet connection with each other. In other words, ratchet wheels 17 are secured to shafts 15, and spring pressed pawls 18 are provided on the ends of tubes or sleeves 16, so that when the latter are turned in one direction, they will transmit a rotary motion to the shaft, but when turned in the opposite direction will turn idly, and vice versa.

On each tube or sleeve 16, three pinions 19 are secured, and these pinions 19 are in mesh with a longitudinal series of teeth 20 on rods 10, that is to say, the rods 10 constitute racks which mesh with the pinions 19, so that when the rods are moved longitudinally, a rotary motion is transmitted to the pinions 19 and tubes or sleeves 16.

My improved water wheel may be operated in various ways by the pressure and force of water. One form being illustrated in which the water flows in a stream and falls onto the periphery of the wheel as shown most clearly in Fig. 1, and the wheel is preferably partially submerged in the water between the walls 1. For this reason, each cylinder 8 is provided at its outer end with an outlet port 21, which, when the cylinder enters the water, will permit the air in the cylinder to escape. When the water falls onto the periphery of the wheel as shown in Fig. 1, it enters the cylinders and causes the pistons 9 to be forced downward. This movement of the pistons, through the medium of the toothed racks 20 and pinions 19, transmits to the tube or sleeves 16, a rotary motion, and as the pawls 18, when the sleeves or tubes 16 are turned in one direction, lock the sleeves or tubes to the shafts 15, these shafts 15 will also be revolved and the pinions 14 thereon. As these pinions 14 engage the stationary racks 13, the water wheel must turn around the racks 13 and transmit a rotary motion to the shaft 2. As seen in Fig. 1, as each cylinder emerges from the water, its piston is in its outer end, and the force of water will force the piston to the inner end of the cylinder, and as these pistons or sets of pistons are regularly presented to the force of water, a continuous powerful rotary movement will be transmitted to the shaft. To guide the movement of the reciprocating elements, grooved guides 22 are secured to the wheel and rods 11 on yokes 12 project into and move in the grooves of these guides.

While I have illustrated my improved water wheel in connection with a fall of water, I would have it understood that I do not limit the same to such a use, as it might be used in a current of water, or in other ways in which the pressure of water may be utilized to move the pistons in the cylinders, and I therefore, claim, broadly, the idea of moving the pistons longitudinally of the cylinders by means of water power, so as to transmit a rotary motion to the water wheel, nor, do I limit myself to the precise details of construction set forth, but consider myself at liberty to make such changes and alterations as fairly fall within the spirit and scope of the appended claims.

Having thus described my invention what I claim as new and desire to secure by Letters Patent is:

1. In a water wheel, the combination with a rotary element, of cylinders carried by the rotary element, radially disposed and located in alinement at opposite sides of the center of the rotary element, pistons in said cylinders, devices connecting said pistons, and means operated by said devices for transmitting a rotary motion to the rotary element when the pistons are reciprocated, substantially as described.

2. In a water wheel, the combination with a rotary element, of a plurality of coöperating radially disposed opposed cylinders on said rotary element, pistons in said cylinders, devices connecting said pistons, and means operated by said devices for transmitting a rotary motion to the rotary element when the pistons are reciprocated.

3. In a water wheel, the combination with a rotary element, of a plurality of opposed radially disposed cylinders on the rotary element, pistons in said cylinders, rigid devices connecting the pistons in the opposed cylinders, fixed circular racks and pinions meshing with said racks and turned by the reciprocating movement of said connecting devices.

4. In a water wheel, the combination with a support, and a shaft mounted to turn on the support, of a wheel secured to said shaft, radially disposed cylinders carried by the wheel, pistons in said cylinders, fixed racks on the support, pinions on the wheel meshing with the racks, and means for turning said pinions when said pistons are reciprocated.

5. In a water wheel, the combination with a support, and a shaft on the support, of a wheel fixed to the shaft, a plurality of opposed radially disposed cylinders on the wheel, pistons in the cylinders, rigid devices connecting the pistons of opposed cylinders, racks on said rigid devices, pinions on the wheel meshing with said racks, and devices operated by said pinions when said pistons are reciprocated to transmit a rotary motion to the wheel.

6. In a water wheel, the combination with a support, and a shaft mounted on the support, of a wheel secured on the shaft, a plurality of radially disposed cylinders on the wheel, pistons in the cylinders, rods secured to the pistons, and having rack teeth thereon, yokes straddling the shaft and connecting opposed piston rods, fixed circular racks on the support, a circular series of shafts carried by the wheel, pinions on said shafts meshing with the fixed racks, sleeves on said shafts, ratchet means connecting said sleeves and shafts, and pinions secured on said sleeves and meshing with the rack teeth of the piston rods.

7. In a water wheel, the combination with a support, and a shaft on the support, of a wheel secured on the shaft, a plurality of radially disposed sets of cylinders secured to the wheel, pistons in the cylinders, rods secured to the pistons, rack teeth on the rods, transverse rods connecting the inner ends of the piston rods, yokes connecting the transverse rods of the opposed sets of piston rods and straddling the shaft, circular racks fixed to the support, shafts carried by the wheel, pinions on said shafts meshing with the racks, sleeves on said shafts, ratchet means connecting said sleeves and shafts, and pinions on the sleeves meshing with the rack teeth of the piston rods.

8. In a water wheel, the combination with a support, and a shaft on the support, of a wheel secured on the shaft, a plurality of radially disposed sets of cylinders secured to the wheel, pistons in the cylinders, rods secured to the pistons, rack teeth on the rods, transverse rods connecting the inner ends of the piston rods, yokes connecting the transverse rods of the opposed sets of piston rods and straddling the shaft, circular racks fixed to the support, shafts carried by the wheel, pinions on said shafts meshing with the racks, sleeves on said shafts, ratchet means connecting said sleeves and shafts, pinions on the sleeves meshing with the rack teeth of the piston rods, and air outlet ports at the outer ends of and projecting peripherally of the wheel from the cylinders.

9. In a water wheel, the combination with a rotary element, of a plurality of radially disposed coöperating opposed reciprocating elements carried by the rotary element, and gearing operated by the reciprocating element to transmit a rotary motion to the rotary element.

10. In a water wheel, the combination with a rotary element, of a plurality of radially disposed coöperating opposed cylinders on said rotary element, pistons in said cylinders, devices connecting said pistons, and gearing operated by said devices for transmitting a rotary motion to the rotary element when the pistons are reciprocated.

11. In a water wheel, the combination with a rotary element, of a plurality of opposed radially disposed cylinders on the rotary element, pistons in said cylinders, rigid devices connecting the pistons in the opposed cylinders, means guiding the movement of the rigid devices, fixed circular racks and pinions meshing with said racks and turned by the reciprocating movement of said connecting devices.

12. In a water wheel, the combination with a support, a shaft mounted to turn on the support, of a wheel secured to said shaft, radially disposed cylinders carried by the wheel, pistons in said cylinders, fixed racks on the support, pinions on the wheel meshing with the racks, and racks and pinions for turning said pinions when said pistons are reciprocated.

13. In a water wheel, the combination with a support, and a shaft on the support, of a wheel fixed to the shaft, a plurality of opposed radially disposed cylinders on the wheel, pistons in the cylinders, rigid devices connecting the pistons of opposed cylinders, guides for said rigid devices, racks on said rigid devices, pinions on the wheel meshing with said racks, and devices operated by said pinions when said pistons are reciprocated to transmit a rotary motion to the wheel.

14. In a water wheel, the combination with a support, and a shaft mounted on the support, of a wheel secured on the shaft, a plurality of radially disposed cylinders on the wheel, pistons in the cylinders, rods secured to the pistons, and having rack teeth thereon, yokes straddling the shaft and connecting opposed piston rods, grooved guides for said yokes, fixed circular racks on the support, a circular series of shafts carried by the wheel, pinions on said shafts meshing with the fixed racks, sleeves on said shafts, ratchet means connecting said sleeves and shafts, and pinions secured on said sleeves and meshing with the rack teeth of the piston rods.

15. In a water wheel, the combination with a support, and a shaft on the support, of a wheel secured on the shaft, a plurality of radially disposed sets of cylinders secured to the wheel, pistons in the cylinders, rods secured to the pistons, rack teeth on the rods, transverse rods connecting the inner ends of the piston rods, yokes connecting the transverse rods of the opposed sets of piston rods and straddling the shaft, grooved guides for said transverse rods, circular racks fixed to the support, shafts carried by the wheel, pinions on said shafts meshing with the racks, sleeves on said shafts, ratchet means connecting said sleeves and shafts, and pinions on the sleeves meshing with the rack teeth of the piston rods.

16. In a water wheel, the combination with a support, and a shaft on the support, of a wheel secured on the shaft, a plurality of radially disposed sets of cylinders secured to the wheel, pistons in the cylinders, rods secured to the pistons, rack teeth on the rods, transverse rods connecting the inner ends of the piston rods, yokes connecting the transverse rods of the opposed sets of piston rods and straddling the shaft, grooved guides for said transverse rods, circular racks fixed to the support, shafts carried by the wheel, pinions on said shafts meshing with the rack, sleeves on said shafts, ratchet means connecting said sleeves and shafts, pinions on the sleeves meshing with the rack teeth of the piston rods, and air outlet ports at the outer ends of and projecting peripherally of the wheel from the cylinders.

In testimony whereof I have signed my name to this specification in the presence of two subscribing witnesses.

FREDERICK OVERFIELD.

Witnesses:
 WM. N. STONE,
 DANIEL J. DUNSMAN.